Aug. 6, 1940.　　　L. M. DURAND　　　2,210,234
FISH-FILLETING MACHINE
Filed June 1, 1937　　　3 Sheets-Sheet 1
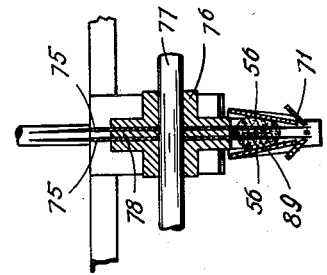
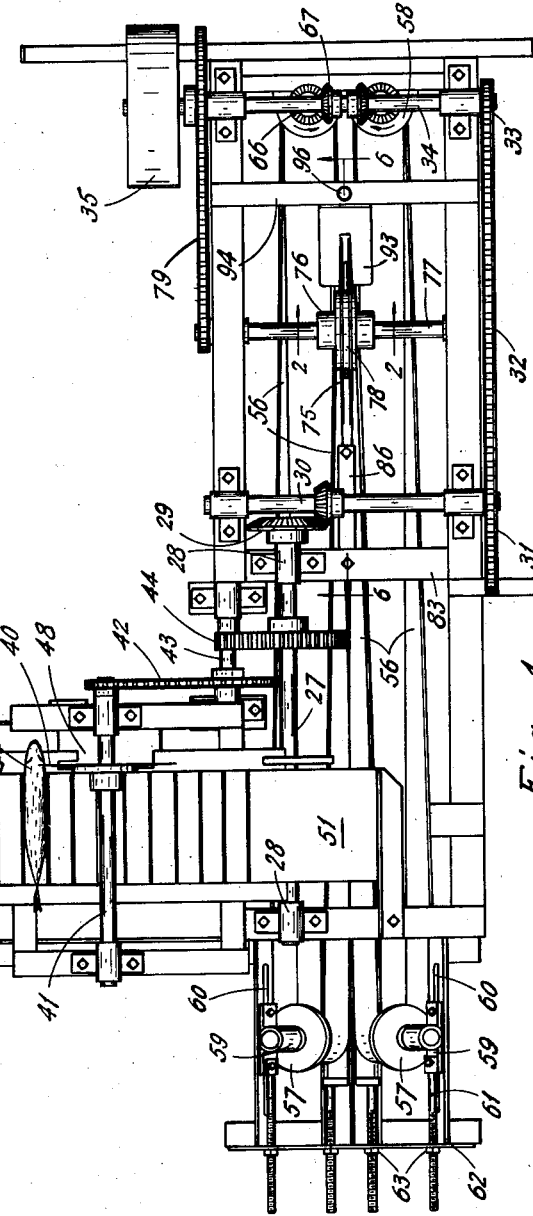
INVENTOR.
Lee. M. Durand.
BY
ATTORNEY.

Aug. 6, 1940.　　　　L. M. DURAND　　　　2,210,234
FISH-FILLETING MACHINE
Filed June 1, 1937　　　3 Sheets-Sheet 2
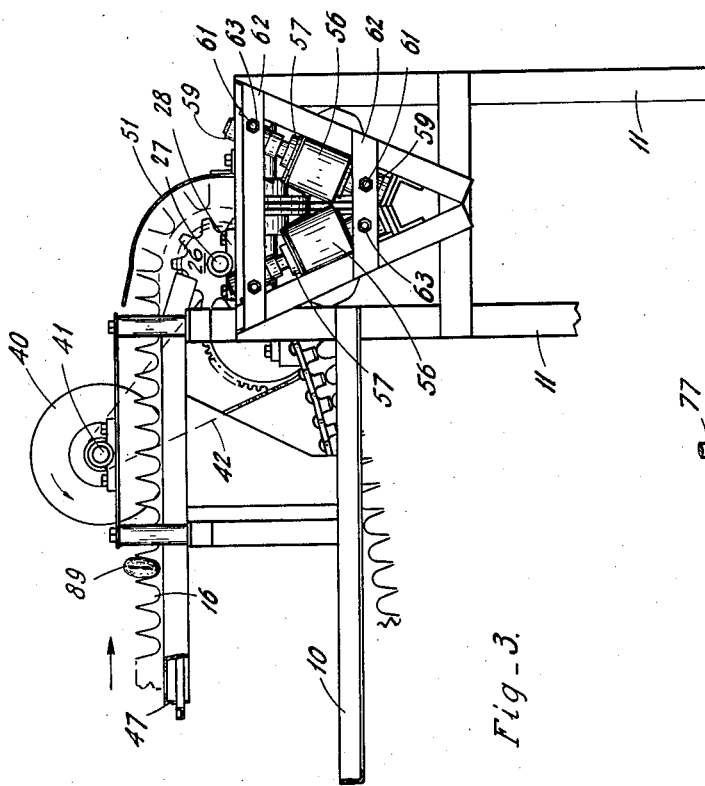
Fig.-3.
Fig.-4.
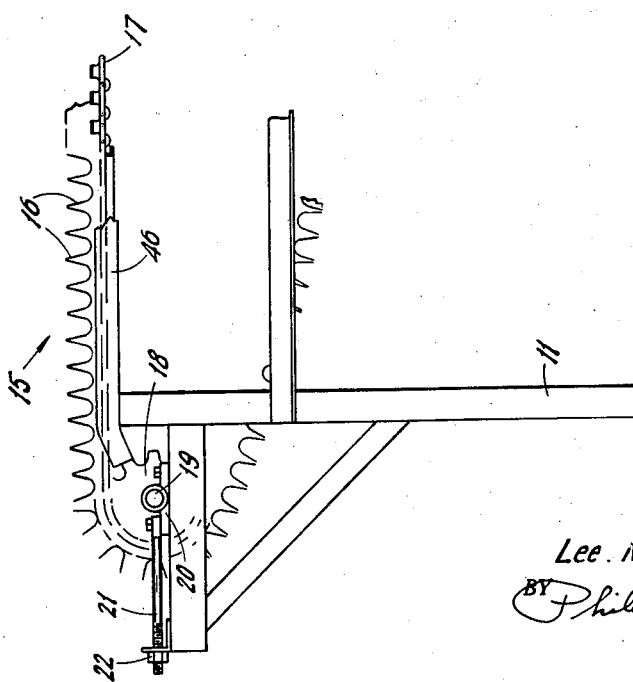
INVENTOR.
Lee. M. Durand.
BY Philip G. Minnis.
ATTORNEY.

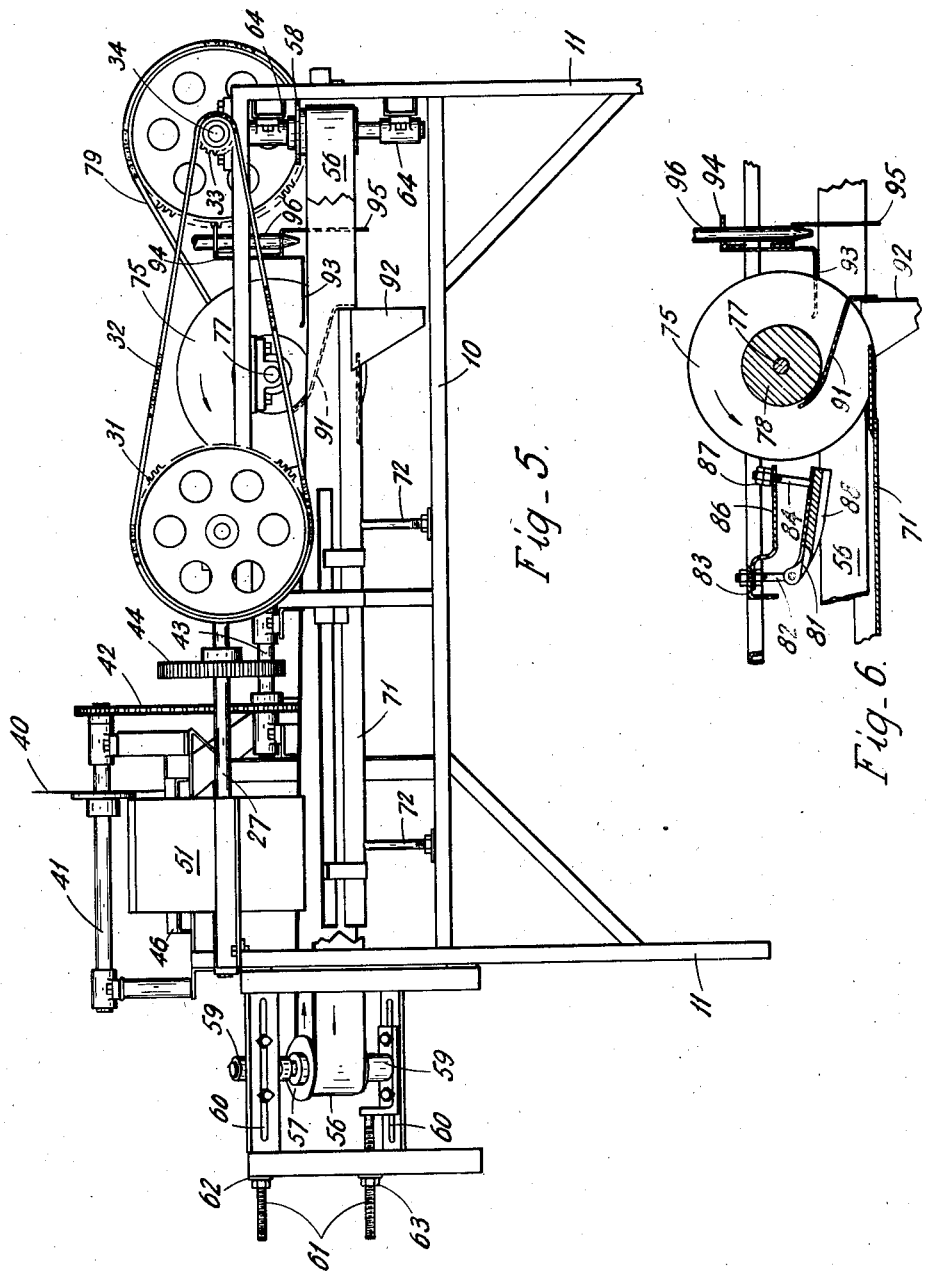

Patented Aug. 6, 1940

2,210,234

UNITED STATES PATENT OFFICE 2,210,234

FISH-FILLETING MACHINE

Lee M. Durand, Monterey, Calif.

Application June 1, 1937, Serial No. 145,773

20 Claims. (Cl. 17—4)

This invention is concerned with machines for filleting fish, and more particularly to a machine of this character which is of simple construction and operates in an efficient manner to behead fish fed thereto, and to thereafter perform a filleting operation by separating the two slabs of meat to either side of the back bone from the back bone, the tail, and the entrails of the fish.

It is a general object of the invention to provide an improved fish filleting machine.

Another object of the invention is to provide improved means for feeding and positioning the fish relative to the filleting knives.

Another object of the invention is to provide a machine of the character referred to, having improved means for holding the fish firmly and in centered relation relative to the filleting knives.

Other objects will appear from the following description of a preferred embodiment of the invention.

In the drawings:

Fig. 1 is a plan view of my improved fish filleting machine.

Fig. 2 is a fragmentary vertical section showing the relation of the filleting knives to the feed belts therefor, and is taken in a plane indicated by the line 2—2 in Fig. 1.

Fig. 3 is an elevational view of one side of the machine.

Fig. 4 is a perspective view of the filleting knives and the feed belts therefor, the other parts being omitted for clearness.

Fig. 5 is an elevational view from another side of the machine showing the fish filleting knives and the feed belts therefor in side elevation, with one feed belt partially broken away.

Fig. 6 is a vertical longitudinal section of the filleting mechanism and is taken in a plane indicated by the line 6—6 in Fig. 1.

Generally, the machine of my invention comprises beheading means in the form of a conveyor to which the fish are fed in predetermined position so as to have their heads project on one side of the conveyor to be cut off by a knife as they travel with the conveyor. After the beheading operation, the conveyor dumps the fish into the feed means of the filleting mechanism. The filleting mechanism preferably comprises a pair of opposed belts with their adjacent stretches traveling in the same direction past a pair of rotary filleting knives. Subsequently the two fillets and the refuse portion of the fish are stripped from the knives and deposited at separate locations.

Referring to Figs. 1, 3 and 5, it will be noted that the machine is provided with a generally L-shaped frame including a plurality of suitably spaced horizontal angles or bars 10 which are suitably interconnected and supported by posts or legs 11. As seen most clearly in Figs. 1 and 3, the beheading mechanism is mounted in one arm of the L and comprises a feed conveyor 15 which may include a series of U-shaped fish holding troughs 16 extending across and suitably secured to a feed chain 17. At the feed end of the conveyor, the chain 17 is trained about an idler sprocket 18 mounted on a shaft 19 which may be adjustably supported on the frame as bearings 20. The bearings 20 are slidably mounted on the frame and have their position controlled by adjusting screws 21 and nuts 22 associated therewith to adjust the tension of the feed conveyor. At their discharge ends, the chains 17 are trained about a drive sprocket 26 mounted on a shaft 27 which is supported in suitable bearings 28 on the frame as seen most clearly in Fig. 1.

At one end, the conveyor drive shaft 27 is provided with a bevel gear 29 which meshes with a suitable bevel pinion on a shaft 30 extending at right angles to the shaft 27 and also journalled in suitable bearings on the frame. At one end, shaft 30 is provided with a sprocket wheel 31 (Figs. 1 and 5) which is driven through a chain 32 from a smaller sprocket wheel 33 on a transverse drive shaft 34 mounted in suitable bearings on the frame and having a pulley 35 secured thereon to receive a drive from any suitable source of power.

The above drive train serves to move the conveyor 15 with its upper stretch travelling in the direction of the arrow in Fig. 3, so that a fish positioned in a trough 16 with its back down and its head extending past one side as indicated at 39 in Fig. 1, will travel past a rotary beheading knife 40 (Figs. 1, 3 and 5) suitably mounted on a shaft 41 journalled in suitable bearings on the frame. At one end, shaft 41 is provided with a suitable chain and sprocket drive 42 from a shaft 43 which may be driven through gearing 44 from the shaft 27 so as to provide a relatively rapid rate of rotation for the knife 40.

If desired, a pair of supporting strips 46 and 47 may be provided beneath either side of the upper stretch of the conveyor 15 to support the ends of the troughs 16 during the operative part of their travel. The strip 47 may be of sufficient width to support the heads of fish in the troughs 16 and may be cut away as at 48 adjacent the knife 40 to provide clearance for the knife and an opening through which the heads of the fish may fall as they are cut off. Usually, the head is not completely severed, but is partially pulled loose from the body of the fish, and may carry a part of the entrails with it.

After the fish are beheaded, they are fed from the conveyor of the beheading mechanism in a predetermined position to the feed means of the filleting mechanism. As previously stated, fish positioned in the U-shaped troughs 16, have their head ends and backs in a selected relation, with their backbones in a substantially vertical position, and the position of the fish relative to the troughs 16 is maintained as they travel around the discharge end of the conveyor by an arcuate retaining plate 51 (Figs. 1 and 3) which extends around such discharge end in spaced relation from the troughs 16. The plate 51 holds the fish in the pockets or troughs 16 until the troughs are positioned to discharge the fish with their backs up and with their backbones in substantially vertical position onto the feed or conveyor means of the filleting mechanism.

Such conveying means is preferably formed by a pair of belts 56 which extend about respective idler rollers 57 at their feed ends and respective driving rollers 58 at their discharge ends. Rollers 57 as seen most clearly in Figs. 1 and 5, have their shafts lying in the same vertical plane but diverge outwardly at their upper ends from a vertical position. The rollers 57 are suitably journalled in bearings 59 which are slidably mounted in guide slots 60 of the frame, and have adjusting screws 61 secured thereto and extending through bars 62 of the frame to receive adjusting nuts 63. Thus, the rollers 57 can be moved longitudinally with respect to the belts 56 to vary the tension thereon. The driving rollers 58 are journalled by bearings 64 with their axes vertical and at their upper ends are provided with bevel gears 66 which mesh with similar bevel gears 67 on the drive shaft 34. The belts 56 therefore have their adjacent stretches travelling in the same direction from the the feed to the discharge end, while the inclined axes of the rollers 57 at their feed end keep the upper edges of the belts apart to receive the fish fed thereto from the conveyor 15 while the lower edges are maintained together to prevent the fish falling therethrough.

In addition to the inclined mounting of the idler rollers 57, the V-shaped relation of the belts at their feed end may be maintained by V-shaped guide means in the form of a trough 71 (Figs. 2, 5 and 6) which is mounted by standards 72 on the frame to engage and guide the adjacent stretches of the belts 56 so as to maintain the lower edges together.

From the above description, it will be seen that as the adjacent stretches of the belts travel from their feed to their discharge end, the V-shaped relation thereof is gradually narrowed until the belts are in substantially parallel relation at the rollers 58. Thus, a fish fed thereto will be received and positioned in upright relation with its head end in the direction of travel and will be gripped firmly by the of the belts, and will be gripped firmly by the belts as they approach their discharge end where the filleting knives are associated therewith.

The filleting means may comprise a pair of rotary knives 75 (Figs. 1 and 2) which are preferably parallel and have their hubs 76 suitably secured on a shaft 77, being spaced apart by a disc spacer 78. The shaft 77 is mounted in suitable bearings on the frame and is driven from one end by a chain and sprocket drive 79 from the drive shaft 34. As seen in Figs. 2 and 6, the shaft 77 is positioned above the belts 56 and the knives 75 are of sufficient diameter so that they extend between and below the belts 56, the trough 71 being slotted to receive the lowermost edges of the knives.

The knives 75 are rotated rapidly in the direction of the arrow in Fig. 6 so that they cut downwardly through the fish which is supported by the belts and the trough 71. Guide means is provided for insuring proper positioning of the fish between the belts 56 as it is fed to the knives for the filleting operation. Such means comprises a presser guide 81 pivotally supported on a U-bolt 82 secured by suitable fastening bolts in a cross angle 83 of the frame. To provide a floating mounting for the guide 81, its free end is provided with an upright bolt 84 extending through an apertured strip 86 supported on the angle 83 and having fastening nuts 87 threaded on the projecting end thereof. Thus the presser guide 81 is free to move up from the position shown in Fig. 6 as a fish passes thereunder, to guide the fish and maintain its upright position relative to the knives. In order that the backbone of the fish will pass between the knives, the bottom surface of the guide 81 is provided with a longitudinal groove 88 of concave cross section to engage the back of the fish passing thereunder and cooperate with the belts 56 in maintaining the position of the fish as illustrated at 89 in Fig. 2.

Stripper means is provided between the knives 75 to remove the back bone, tail and entrails from between the knives and to direct the same to a discharge chute. Such stripper means comprises a strip 91 (Figs. 5 and 6) which is positioned between the knives and extends downwardly from adjacent the spacer disc 78 and is secured as by welding on a discharge chute 92. The chute 92 is secured at one end of the trough 71 and is positioned so that the center part of the fish which is cut between the knives 75 is directed by the strip 91 from between the knives and downwardly through the chute 92.

Stripper means are also provided for removing the fillets from the outer surfaces of the knives, in the form of a pair of stripper blades 93 (Figs. 1, 5 and 6) supported on cross angles 94 of the frame in close relation to the outer faces of the knives so as to remove the fillets therefrom and direct the same against a deflecting plate 95 also supported by an angle 94. To remove and facilitate the discharge of the fillets into a suitable receptacle below the plate 95, a water pipe 96 may be mounted in vertical position in the angles 94 for connection to a suitable source of water supply and may have its lower end formed as a nozzle to discharge a stream of water along the plate 95 to carry the fillets downwardly off the plate.

To summarize the operation of my filleting machine, the operator places the fish in the troughs 16 of beheading mechanism conveyor with their backs down and their heads projecting from one side as shown at 89 in Fig. 1. The troughs 16 carry the fish past the knife 49 which cuts off their heads, and then in cooperation with the guide plate 51 delivers the fish to the belts 56 with their backs up, their backbones in substantially vertical position and their head ends foremost in the direction of travel of the belts. The feed ends of the belts 56 are trained about the inclined rollers 57 so that a V-shaped fish receiving opening is provided, with the lower edges of the belts supported and guided by the trough 71. In this manner, the least solid or belly portion of the fish is supported firmly between the lower edges of the belts.

As the fish are carried along by the belts 56, the upper edges of the belts converge because of the upright position of the driving rollers 58 at their discharge ends, so that each fish is correctly positioned to engage beneath the floating guide 81 immediately before reaching the filleting knives. The belts 56, with the guide 81, insure proper positioning of the fish relative to the knives 75 so that the central part of the fish, comprising the backbone, entrails, and tail, is severed from the two fillets as the fish is carried past the knives. In operation, although the filleting knives may pass inside the belly cavity, all of the entrails and refuse portion are carried between the knives with the backbone and tail. Respective strippers 91 and 93 remove the fish sections from the adjacent and remote surfaces of the knives 75 and direct the refuse and fillet sections to their respective discharge means 92 and 95.

While I have shown and described a preferred embodiment of my invention, such invention is capable of modification and variation without departing from the spirit and scope thereof as defined in the claims appended hereto.

I claim:

1. In a fish filleting machine, the combination with knife means, of a pair of feed belts for carrying fish between the adjacent stretches thereof past said knife means, means for maintaining the lower edges of said belts closely adjacent each other throughout the fish carrying travel thereof, and means for controlling the position of the upper edges of said belts during said travel to separate said upper edges at the feed end of said belts and to thereafter effect convergence thereof toward the discharge end of said belts.

2. In a fish filleting machine, the combination with a pair of parallel knives, of a pair of feed belts for carrying fish between the adjacent stretches thereof past said knives, whereby said knives will sever the fish fillets from the backbone of the fish, means for maintaining the lower edges of said belts closely adjacent each other throughout the fish carrying travel thereof, and means for controlling the position of the upper edges of said belts during said travel to separate said upper edges at the feed end of said belts and to thereafter effect convergence thereof toward the discharge end of said belts.

3. In a fish filleting machine, the combination with knife means, of a pair of feed belts for carrying fish between the adjacent stretches thereof past said knife means, said belts having their opposed surfaces in upwardly opening V-shaped relation from the lower to the upper side edges of said belts at the feed end thereof and converging toward the discharge end thereof to gradually close the V-shape of the opening therebetween.

4. In a fish filleting machine, the combination with a pair of parallel knives, of a pair of feed belts for carrying fish between the adjacent stretches thereof past said knives, whereby said knives will sever the fish fillets from the backbone of the fish, said belts having their opposed surfaces in upwardly opening V-shaped relation from the lower to the upper side edges of said belts at the feed end thereof and converging toward the discharge end thereof to gradually close the V-shape of the opening therebetween.

5. In a fish filleting machine, the combination with a pair of parallel knives, of a pair of feed belts for receiving and positioning fish with the backbone thereof in a plane parallel to and lying between the planes of said knives, and for thereafter carrying the fish through said knives whereby the fillets are cut from the backbone and tail, said belts having their opposed surfaces in upwardly opening V-shaped relation from the lower to the upper side edges of said belts at the feed end thereof and converging toward substantially parallel relation at the discharge end thereof.

6. In a fish filleting machine, the combination with a pair of parallel knives, of opposed conveyor means for receiving and positioning fish with the backbone thereof in a plane parallel to and lying between the planes of said knives, and for thereafter carrying the fish through said knives whereby the fillets are cut from the backbone and tail, said conveyor means having their opposed surfaces in upwardly opening V-shaped relation at the feed end thereof and converging toward substantially parallel relation at the discharge end thereof, the V-shape of said opening extending transversely of the direction of travel of said conveyor means and from the lower to the upper side edges thereof.

7. In a fish filleting machine, the combination with a pair of parallel knives, of a pair of feed belts for receiving and positioning fish with the backbone thereof in a plane parallel to and lying between the planes of said knives, and for thereafter carrying the fish through said knives whereby the fillets are cut from the backbone and tail, said belts having their opposed surfaces in upwardly opening V-shaped relation at the feed end thereof and converging toward substantially parallel relation at the discharge end thereof, and a guide positioned above said belts in advance of said knives for coöperation with a fish carried by said belts.

8. In a fish filleting machine, the combination with a pair of parallel knives, of a pair of feed belts for receiving and positioning fish with the backbone thereof in a plane parallel to and lying between the planes of said knives, and for thereafter carrying the fish through said knives whereby the fillets are cut from the backbone and tail, said belts having their opposed surfaces in V-shaped relation at the feed end thereof and converging toward substantially parallel relation at the discharge end thereof, a guide positioned above said belts in advance of said knives for cooperation with a fish carried by said belts, and means mounting said guide for floating engagement with the fish.

9. In a fish filleting machine, the combination with a pair of parallel knives, of a pair of feed belts for receiving and positioning fish with the backbone thereof in a plane parallel to and lying between the planes of said knives, and for thereafter carrying the fish through said knives whereby the fillets are cut from the backbone and tail, said belts having their opposed surfaces in V-shaped relation from the lower to the upper side edges of said belts at the feed end thereof and having their upper edges converging toward the discharge end thereof, and transverse conveying means above said feed belts for delivering fish in a predetermined position with the back thereof upwardly disposed to the feed end of said belts.

10. In a fish filleting machine, the combination with a pair of parallel knives of opposed conveyor means for receiving and positioning fish with the backbone thereof in a plane parallel to and lying between the planes of said knives, and for thereafter carrying the fish through said knives whereby the fillets are cut from the backbone and tail, said conveyor means having their opposed surfaces in upwardly opening V-shaped relation from the lower to the upper side edges thereof at the feed end thereof and having their upper edges converging toward substantially parallel relation at the discharge end thereof, and transverse conveying means above said conveyor means for delivering fish in a predetermined position with the back thereof upwardly disposed to the feed end of said conveyor means.

11. In a fish filleting machine, the combination with a pair of rotary parallel knives, of a pair of feed belts for receiving and positioning fish with the backbone thereof lying in a plane parallel to and between the planes of said knives, and for thereafter carrying the fish through said knives whereby the fillets are cut from the backbone and tail, said belts having their opposed surfaces in V-shaped relation at the feed end thereof and converging toward substantially parallel relation at the discharge end thereof, and V-shaped guide means for engaging the lower edges of said belts during the fish carrying travel thereof.

12. In a fish filleting machine, the combination with a pair of rotary parallel knives, of a pair of feed belts for receiving and positioning fish with the backbone thereof lying in a plane parallel to and between the planes of said knives, and for thereafter carrying the fish through said knives whereby the fillets are cut from the backbone and tail, said belts having their opposed surfaces in V-shaped relation at the feed end thereof and converging toward substantially parallel relation at the discharge end thereof, and V-shaped guide means for engaging the lower edges of said belts during the fish carrying travel thereof, said guide means overlapping and being slotted to receive said knives, whereby to support the belts and maintain the fish firmly in place during the cutting operation.

13. In a fish filleting machine, the combination with a pair of rotary parallel knives, of a pair of feed belts for receiving and positioning fish with the backbone thereof lying in a plane parallel to and between the planes of said knives, and for thereafter carrying the fish through said knives whereby the fillets are cut from the backbone and tail, said belts having their opposed surfaces in V-shaped relation from the lower to the upper side edges of said belts at the feed end thereof and converging toward substantially parallel relation at the discharge end thereof, and means for resisting outward movement of said belts during the fish carrying and filleting operations.

14. In a fish filleting machine, the combination with a pair of rotary parallel knives, of a pair of feed belts for receiving and positioning fish with the backbone thereof lying in a plane parallel to and between the planes of said knives, and for thereafter carrying the fish through said knives whereby the fillets are cut from the backbone and tail, said belts having their opposed surfaces in V-shaped relation transversely of their length at the feed end thereof and converging toward substantially parallel relation at the discharge end thereof, and separate stripper means located between and outside of said knives for removing the refuse and fillets from said knives.

15. In a fish filleting machine, the combination with a pair of rotary parallel knives, of a pair of feed belts for receiving and positioning fish with the backbone thereof lying in a plane parallel to and between the planes of said knives, and for thereafter carrying the fish through said knives whereby the fillets are cut from the backbone and tail, said belts having their opposed surfaces in V-shaped relation transversely of their length at the feed end thereof and converging toward substantially parallel relation at the discharge end thereof, separate stripper means located between and outside of said knives for removing the refuse and fillets from said knives, and discharge means associated with said stripper means to receive the fish sections therefrom.

16. In a fish filleting machine, the combination with a pair of rotary parallel knives, of a pair of feed belts for receiving and positioning fish with the backbone thereof lying in a plane parallel to and between the planes of said knives, and for thereafter carrying the fish through said knives whereby the fillets are cut from the backbone and tail, said belts having their opposed surfaces in V-shaped relation at the feed end thereof and converging toward substantially parallel relation at the discharge end thereof, stripper means for removing fillets from said knives, and means for applying a jet of liquid to the fish fillets to facilitate their ejection from the machine.

17. A fish filleting machine comprising a pair of adjacent parallel belts, roller means mounting the feed ends of said belts with their upper edges spaced apart to provide a V-shaped fish receiving opening between the lower and upper side edges of said belts, roller means mounting the discharge end of said belts to effect convergence of said belts toward the discharge end to gradually close the V-shape of said opening, means for driving said belts so that their adjacent stretches travel from said feed end to said discharge end, and a plurality of parallel knives for slicing fish carried between said belts.

18. In a fish filleting machine, fish beheading mechanism including a conveyor for carrying fish in predetermined position, and a knife located intermediate the ends of said conveyor for beheading fish carried thereby, and fish filleting mechanism adjacent the discharge end of said conveyor including a pair of belts with their feed ends at an angle to each other to provide a V-shaped opening extending transversely of said belts between the respective side edges thereof whereby to receive beheaded fish from said beheading mechanism with the head ends of the fish foremost in the direction of travel of the belts, and knife means between said belts for cutting fillets from fish carried thereby, said belts converging toward substantially parallel relation at the discharge end thereof.

19. In a fish filleting machine, fish beheading mechanism including a conveyor for carrying fish in predetermined position, a knife located intermediate the ends of said conveyor for beheading fish carried thereby, and a fish retaining guide cooperating with said conveyor around the discharge end thereof to deliver fish therefrom with the backbone lying substantially in a vertical plane and inverted from said predetermined position, and fish filleting mechanism adjacent the discharge end of said conveyor including a pair of belts with their feed ends at an angle to each other to receive beheaded fish from said beheading mechanism with the head ends of the fish foremost in the direction of travel of the belts, and knife means between said belts for cutting fillets from fish carried thereby, said belts converging toward substantially parallel relation at the discharge end thereof to position and maintain the fish with its backbone in vertical position during the filleting operation.

20. In a fish filleting machine having a conveyor for carrying fish in predetermined position, fish filleting mechanism adjacent the discharge end of said conveyor including a pair of belts with their feed ends at an angle to each other to receive fish from said conveyor with the head ends of the fish foremost in the direction of travel of the belts, knife means between said belts for cutting fillets from fish carried thereby, said belts converging toward substantially parallel relation at the discharge end thereof, and means cooperating with said conveyor to cause delivery of fish therefrom to said belts inverted from said predetermined position thereof.

LEE M. DURAND.